United States Patent
Ledr

(10) Patent No.: US 10,340,800 B2
(45) Date of Patent: Jul. 2, 2019

(54) SHORT CIRCUIT PROTECTION FOR A POWER CONVERTER

(71) Applicant: Dialog Semiconductor (UK) Limited, London (GB)

(72) Inventor: Jiri Ledr, Germering (DE)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 15/943,811

(22) Filed: Apr. 3, 2018

(65) Prior Publication Data
US 2018/0294725 A1    Oct. 11, 2018

(30) Foreign Application Priority Data

Apr. 6, 2017 (DE) ..................... 10 2017 205 922

(51) Int. Cl.
| | |
|---|---|
| H02M 3/158 | (2006.01) |
| H02M 1/32 | (2007.01) |
| H02M 1/00 | (2006.01) |

(52) U.S. Cl.
CPC .......... *H02M 3/1582* (2013.01); *H02M 1/32* (2013.01); *H02M 3/158* (2013.01); *H02M 2001/0003* (2013.01)

(58) Field of Classification Search
CPC .......... H02M 1/32; H02M 2001/0003; H02M 3/1582; H02M 3/158
See application file for complete search history.

(56) References Cited

U.S. PATENT DOCUMENTS

| 4,184,197 A * | 1/1980 | Cuk | ....................... H02M 3/005 |
| | | | 363/16 |
| 6,462,962 B1 * | 10/2002 | Cuk | ........................ H02M 1/34 |
| | | | 363/131 |

(Continued)

FOREIGN PATENT DOCUMENTS

| DE | 11 2004 000 598 | 2/2006 |
| WO | WO 2004/091069 | 10/2004 |

OTHER PUBLICATIONS

German Office Action, File No. 10 2017 205 922.2, Applicant: Dialog Semiconductor (UK) Limited, dated Apr. 12, 2018, 5 pages, and English Language translation 5 pages.

(Continued)

*Primary Examiner* — Jue Zhang
*Assistant Examiner* — Bart Iliya
(74) *Attorney, Agent, or Firm* — Saile Ackerman LLC; Stephen B. Ackerman

(57) ABSTRACT

A switched mode power converter is described, configured to convert electrical power between a first voltage at a first port and a second voltage at a second port, where the first and second voltages are relative to a reference potential. The power converter comprises an inductive element having a first side and a second side, where the first side of the inductive element is coupled to the first port. The power converter comprises a power switch configured to couple or to decouple the second side of the inductive element to or from the reference potential. The power converter comprises a capacitive element having a first side and a second side, where the first side of the capacitive element is coupled to the power switch and the second side of the capacitive element is coupled to the second port. The power converter comprises an auxiliary switch configured to couple or to decouple the second side of the capacitive element to or from the reference potential. The power converter comprises (Continued)

a control unit configured to control the power switch and the auxiliary switch in a repetitive manner to convert electrical power.

20 Claims, 5 Drawing Sheets

(56) References Cited

U.S. PATENT DOCUMENTS

| | | | |
|---|---|---|---|
| 2005/0168199 A1* | 8/2005 | Lambertus Claessens | H02M 3/005 323/222 |
| 2007/0216390 A1* | 9/2007 | Wai | H02M 3/158 323/351 |
| 2010/0045251 A1* | 2/2010 | Murota | H02M 3/158 323/282 |
| 2011/0216567 A1* | 9/2011 | Fan | H02M 7/537 363/131 |
| 2012/0169309 A1 | 7/2012 | Zhang et al. | |
| 2015/0200536 A1 | 7/2015 | Li et al. | |

OTHER PUBLICATIONS

"Battery Equalization Using Bi-directional Cuk Converters in DCVM Operation," by Yuang-Shung Lee et al., 2005 IEEE 36th Power Electronics Specialists Conference, Jun. 16, 2005, pp. 765-771.
German Office Action, Reference No. 102017205922.2, Applicant: Dialog Semiconductor (UK) Limited, dated Nov. 9, 2017, 4 pgs, and English language translation, 1 pg.

* cited by examiner

SHORT CIRCUIT PROTECTION FOR A POWER CONVERTER

TECHNICAL FIELD

The present document relates to power converters, in particular to short circuit protection for DC-DC power converters.

BACKGROUND

DC-DC power converters, notably DC-DC switched mode power converters, such as a buck converter, a boost converter and/or a buck-boot converter, may be used in various different applications to convert electrical power at an input voltage provided by a power source (e.g. by a battery) into electrical power at a different output voltage which is provided to a load (e.g. to a digital processor). A short circuit at the output of the power converter may lead to substantial short circuit currents at the input of the power converter, wherein such substantial currents may damage the power source.

SUMMARY

An object of the disclosure is to provide a short circuit protection circuit for a switched mode power converter.

A further object of the disclosure is to provide a short circuit protection circuit for a switched mode power converter that is both cost and power efficient.

To accomplish the above and other objects, a switched mode power converter, notably a DC-DC power converter, is described. The power converter is configured to convert electrical power between a first voltage at a first port and a second voltage at a second port. The first voltage may be an input voltage, the first port may be an input port, the second voltage may be an output voltage and the second port may be an output port. As such, power may be transferred from the first port to the second port. In an alternative embodiment, the first voltage may be an output voltage, the first port may be an output port, the second voltage may be an input voltage and the second port may be an input port. As such, power may be transferred from the second port to the first port.

In various embodiments, the power converter may comprise or may be a buck or step-down converter configured to transfer electrical power from the second port to the first port. In various embodiments, the power converter may comprise or may be a boost or step-up converter configured to transfer electrical power from the first port to the second port. In various embodiments, the power converter may comprise or may be a buck-boost converter configured to transfer electrical power from the first port to the second port or to transfer electrical power from the second port to the first port.

The first and second voltages may be relative to a reference potential (e.g. to ground).

The power converter may comprise an inductive element (e.g. an inductor or coil) having a first side and a second side, wherein the first side of the inductive element is coupled (e.g. directly coupled) to the first port, and wherein, the power converter comprises a power switch configured to couple or to decouple (e.g. directly) the second side of the inductive element to or from the reference potential. The power switch may comprise or may be an n-type metal oxide semiconductor, MOS, switch.

The power converter comprises a capacitive element (e.g. a capacitor) having a first side and a second side, wherein the first side of the capacitive element is coupled (e.g. directly coupled) to the power switch, and wherein, the second side of the capacitive element is coupled (e.g. via a second power switch or diode) to the second port of the power converter.

The power converter comprises an auxiliary switch configured to couple or to decouple (e.g. directly) the second side of the capacitive element to or from the reference potential. The auxiliary switch may comprise or may be an n-type metal oxide semiconductor, MOS, switch.

The second side of the inductive element and the first side of the capacitive element may be (directly) coupled to one another. As such, the power switch may be configured to couple or to decouple (e.g. directly) the first side of the capacitive element to or from the reference potential, and the inductive element and the capacitive element may be arranged in series, when the power switch and the auxiliary switch are in off-state.

The power converter comprises a control unit, which is configured to control the power switch and the auxiliary switch in a repetitive manner (e.g. within a sequence of commutation cycles) to convert electrical power.

A power converter is provided which is configured to converter electrical power between different first and second voltages in a power efficient manner. The power converter comprises a capacitive element, which may be used to decouple the first port and the second port from one another in case of a short circuit situation, thereby providing a cost effective short circuit protection.

The control unit may be configured to control the power switch and the auxiliary switch within a sequence of commutation cycles (during standard operation of the power converter), such that a commutation cycle (notably each commutation cycle) comprises a first phase during which the power switch couples the second side of the inductive element to the reference potential (i.e. during which the power switch is in on-state or turned on) and during which the auxiliary switch couples the second side of the capacitive element to the reference potential (i.e. during which the auxiliary switch is in on-state or turned on). A commutation cycle may comprise a first phase during which the inductive element is magnetized (thereby storing energy within the inductive element) and/or during which the capacitive element is discharged.

A commutation cycle (notably each commutation cycle) may comprise a second phase during which the power switch decouples the second side of the inductive element from the reference potential (i.e. during which the power switch is turned off or in off-state) and during which the auxiliary switch decouples the second side of the capacitive element from the reference potential (i.e. during which the auxiliary switch is turned off or in off-state). A second phase may be provided during which the inductive element is demagnetized by coupling the second side of the inductive element to the second port of the power converter via the capacitive element (thereby providing current to the first or second port). The second phase may lead to a (typically minimal) charging of the capacitive element.

By commutating a first phase and a second phase, the power converter may be operated in a power efficient manner for converting electrical power between the first port and the second port.

The control unit may be configured to control the power switch and the auxiliary switch within a sequence of commutation cycles, such that within a commutation cycle the power switch and the auxiliary switch are each turned on and turned off exactly once.

The control unit may be configured to control the power switch and the auxiliary switch within a sequence of commutation cycles, such that within a commutation cycle (notably within each commutation cycle) the power switch and the auxiliary switch are turned on and/or turned off substantially in synchronicity, thereby enabling a power efficient standard operation of the power converter.

The power converter typically comprises a second power switch (which may e.g. be implemented as a diode) configured to couple or to decouple the second side of the capacitive network to or from the second port. The second power switch may comprise or may be an n-type metal oxide semiconductor, MOS, switch. The power switch may be a low side switch and the second power switch may be a high side switch. The power switch and the second power switch may be coupled with one another via the capacitive element.

The power converter may comprise a second set of power switches, notably a half bridge comprising a further high side switch and a further low side switch. The half bridge may be arranged between the first port and the reference potential. The first side of the inductive element may be (directly) coupled to a midpoint between the further high side switch and the further low side switch. By providing a second set of power switches, a buck-boost converter may be implemented.

The control unit may be configured to control the power switch and possibly the second power switch such that the power switch and the second power switch are turned on in a mutually exclusive manner (thereby providing a power efficient standard operation for the power converter).

The control unit may be configured to control the power switch and the auxiliary switch within a sequence of commutation cycles, such that within a commutation cycle (notably within each commutation) the power switch starts coupling the second side of the inductive element to the reference potential at a first coupling time instant, and such that the auxiliary switch starts coupling the second side of the capacitive element to the reference potential at a second coupling time instant, wherein the first coupling time instant precedes the second coupling time instant by at least a pre-determined coupling offset. In other words, the control unit may be configured to control the power switch and the auxiliary switch within a sequence of commutation cycles, such that within a commutation cycle (notably within each commutation cycle) the power switch starts coupling the second side of the inductive element to the reference potential prior to the time instant at which the auxiliary switch starts coupling the second side of the capacitive element to the reference potential. By doing this, a charge within the capacitive element may be partially reused, thereby increasing the power efficiency of the power converter.

In various embodiments, the control unit may be configured to control the power switch and the auxiliary switch within a sequence of commutation cycles, such that within a commutation cycle (notably within each commutation cycle) the power switch starts decoupling the second side of the inductive element from the reference potential at a first decoupling time instant, and such that the auxiliary switch starts decoupling the second side of the capacitive element from the reference potential at a second decoupling time instant, wherein the first decoupling time instant and the second decoupling time instant are offset at the most by a pre-determined decoupling offset (which may be substantially zero). The control unit may be configured to control the power switch and the auxiliary switch within a sequence of commutation cycles, such that within a commutation cycle (notably within each commutation cycle) the power switch starts decoupling the second side of the inductive element from the reference potential substantially at the same time instant at which the auxiliary switch starts decoupling the second side of the capacitive element from the reference potential.

During standard operation, a power efficient conversion of electrical power between different voltages may be provided.

The control unit may be further configured to detect a short circuit situation at the first port or at the second port. For this purpose, the first voltage at the first port or the second voltage at the second port may be compared with a short circuit voltage threshold. If the first voltage or second voltage is at or below the short circuit voltage threshold a short circuit situation may be detected at the first port or at the second port, respectively.

The control unit may be configured, in reaction to detecting a short circuit situation, to control the power switch and the auxiliary switch to arrange the capacitive element and the inductive element in series between the first and second port. By doing this, the first port and the second port are decoupled with regards to a DC current, thereby providing a reliable and safe short circuit protection of the power converter.

The above and other objects are further achieved by a method for operating a power converter as outlined in the present document is described. The method may comprise steps, which correspond to the features of the control unit described in the present document. In particular, the method comprises, during standard operation, commutating a power switch and an auxiliary switch of the power converter between on-state and off-state for a sequence of commutation cycles. The method further comprises detecting a short circuit situation at the first port or at the second port of the power converter. The method further comprises, in reaction to detecting a short circuit situation, controlling the power switch and the auxiliary switch to arrange a capacitive element and an inductive element in series between the first and second port of the power converter, notably to decouple the first port and the second port for DC current.

In various embodiments, a software program is described. The software program may be adapted for execution on a processor and for performing the method steps outlined in the present document when carried out on the processor.

In various embodiments, a storage medium is described. The storage medium may comprise a software program adapted for execution on a processor and for performing the method steps outlined in the present document when carried out on the processor.

In various embodiments, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE FIGURES

The invention is explained below in an exemplary manner with reference to the accompanying drawings, wherein.

DESCRIPTION

Figure 1:
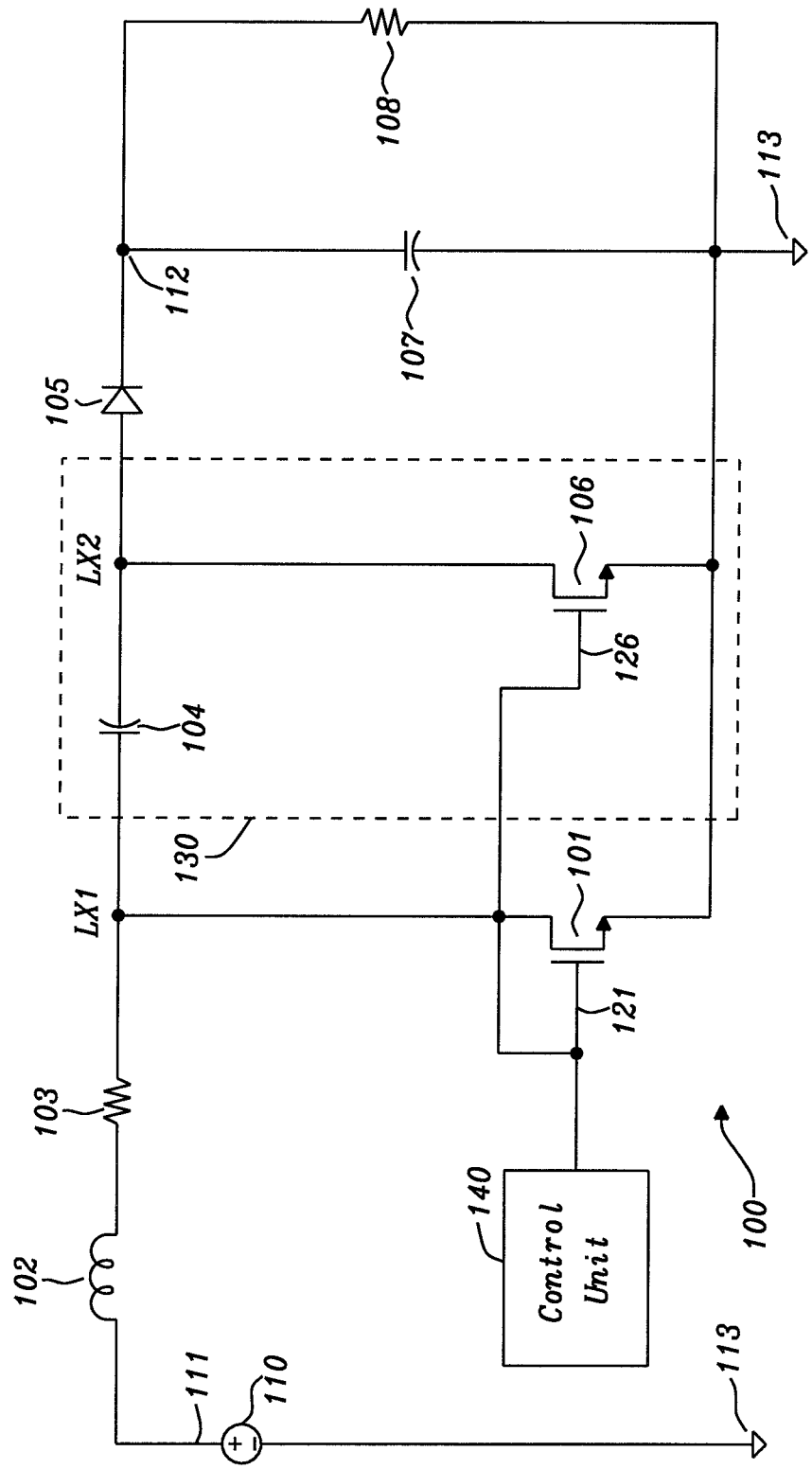
FIG. 1 illustrates an example boost converter with short circuit protection circuitry.

The present document relates to the technical problem of providing power and cost efficient short circuit protection for a switched mode power converter. FIG. 1 shows a boost converter as an example for a switched mode power converter 100. The power converter 100 comprises a first port 111, which serves as input port of the illustrated boost converter, and a second port 112, which serves as an output port of the illustrated boost converter, wherein the input voltage and the output voltage at the respective ports 111, 112 are relative to a reference potential 113 (e.g. ground). The power converter 100 is configured to convert electrical power at the input voltage (provided at the first port 111) into electrical power at the output voltage (provided at the second port 112). The electrical power at the first port 111 is provided by a power supply 110 (e.g. a battery, such as a lithium ion based battery) and the electrical power at the second port 112 is provided to a load 108 (e.g. to a processor of an electronic device). The power converter 100 may comprise an output capacitor 107 arranged between the second port 112 and the reference potential 113 for stabilizing the output voltage.

The power converter 100 comprises a power switch 101 which is configured to couple an inductor 102 (typically comprising a resistance 103) with the reference potential 113 (when closing the power switch 101) for magnetizing the inductor 102, and configured to couple the inductor 102 with the second port 112 (via a diode or power switch 105) for demagnetizing the inductor 102. The inductor 102 is referred to herein generally as inductive element. The power switch 101 may be turned on and off at a certain commutation cycle rate, in order to transfer power from the first port 111 to the second port 112. By varying the duty cycle of the power switch 101 (i.e. by varying the duration of the on-state of the power switch 101 relative to the duration of a commutation cycle), the conversion ratio of the power switch 101 and by consequence the level of the output voltage may be varied. The power switch 101 is controlled via a control port 121 (e.g. a gate) of the power switch 101.

The power converter 100 comprises short circuit protection circuitry 130, which is configured to protect the first port 111 of the power converter 100 from a short circuit at the second port 112 of the power converter 100. In particular, the short circuit protection circuitry 130 is configured to block a (DC) current (e.g. from the first port 111 to the second port 112), subject to detecting a short circuit at the second port 112.

The short circuit protection circuitry 130 comprises a serial capacitor 104 (referred to more generally as capacitive element herein), which is arranged between the inductor 102 and the second port 112, in particular between the inductor 102 and the diode or power switch 105. Furthermore, the short circuit projection circuitry 130 may comprise an auxiliary switch 106, which is configured to couple an output side of the serial capacitor 104 with the reference potential 113 (when the auxiliary switch 106 is closed) or with the second port 112 (when the auxiliary switch 106 is open). Furthermore, an input side of the serial capacitor 104 may be coupled with the power switch 101, such that the input side of the capacitor 104 may be coupled to the reference potential 113 (when the power switch 101 is closed or in on-state) and such that the input side of the capacitor 104 may be coupled to the inductor 102 (when the power switch 101 is open or in off-state).

The auxiliary switch 106 may be controlled via a control port 126 (e.g. a gate) of the auxiliary switch 106. Furthermore, the auxiliary switch 106 may be controlled substantially in synchronicity with the power switch 101, i.e. the auxiliary switch 106 may be put into on-state substantially at the same time instant when the power switch 101 is put into on-state, and/or the auxiliary switch 106 may be put into off-state substantially at the same time instant when the power switch 101 is put into off-state.

As a result of this, the power converter 100 comprises (within a commutation cycle) a first phase, during which the power switch 101 and the auxiliary switch 106 are in on-state, thereby magnetizing the inductor 102 and thereby discharging the serial capacitor 104. Furthermore, the power converter 100 comprises (within a commutation cycle) a second phase, during which the power switch 101 and the auxiliary switch 106 are in off-state, thereby demagnetizing the inductor 102 towards the second port 112 via the serial capacitor 104. Due to the "ramp up" characteristic of the current through the inductor 102, i.e. due to the change of the current through the serial capacitor 104, the serial capacitor 104 acts as a short circuit. Hence, the serial capacitor 104 does not affect the standard operation of the power converter 100.

The power converter 100 comprises a control unit 140, which is configured to control the power switch 101 and the auxiliary switch 106 via the respective control ports 121, 126. Furthermore, the control unit 140 is configured to monitor the state of the second port 112. In particular, the control unit 140 may be configured to monitor the output current and/or the output voltage at the second port 112. By way of example, the control unit 140 may be configured to detect a short circuit situation at the output of the power converter 100 by determining whether the output current is at or above a pre-determined short-circuit current threshold. Alternatively or in addition, a short circuit situation may be detected by determining whether the output voltage is at or below a pre-determined short-circuit voltage threshold.

The control unit 140 may be configured to put the power switch 101 and the auxiliary switch 106 in off-state, subject to detecting a short circuit situation. Furthermore, the power switch 101 and the auxiliary switch 106 may be maintained in off-state, as long as a short circuit situation is detected (e.g. for a time period which may go beyond the duration of a commutation cycle). As a result of this, the second port 112 is decoupled from the first port 111 for DC currents, thereby providing an efficient short circuit protection. In particular, a DC path through the power converter 100 is blocked, subject to detecting a short circuit situation.

Hence, a serial capacitor 104 may be arranged between a first point LX1 (between the inductor 102 and the power switch 101) and a second point LX2 (at the diode or power switch 105). Furthermore, an auxiliary switch 106 may be provided to couple or decouple the midpoint between the serial capacitor 104 and the diode or power switch 105 to the reference potential 113 or from the reference potential 113. This allows standard operation of the power converter 100 while at the same time providing DC isolation in case of a short circuit situation at the second port 112 of the power converter 100.

During standard operation of the power converter 100, the serial capacitor 104 is periodically reset by turning on the power switch 101 and the auxiliary switch 106 substantially at the same time. Notably when using a serial capacitor 104 with a relative high capacitance and when using an auxiliary switch 106 with a relatively low resistance, the power efficiency of the power converter 100 remains substantially unchanged.

Hence power losses inside the protection circuitry 130 may be minimized while keeping the efficiency of the power converter 100 unaffected. Furthermore, cost efficient protection circuitry 130 may be provided (using only a single (external) passive component 104 and an active auxiliary switch 106 (e.g. a low side NMOS switch). Furthermore, the protection circuitry 130 allows for a complete elimination of a DC current path (notably from the input to the output and/or from the output to the input) of a power converter 100, thereby improving safety.

Figure 2:
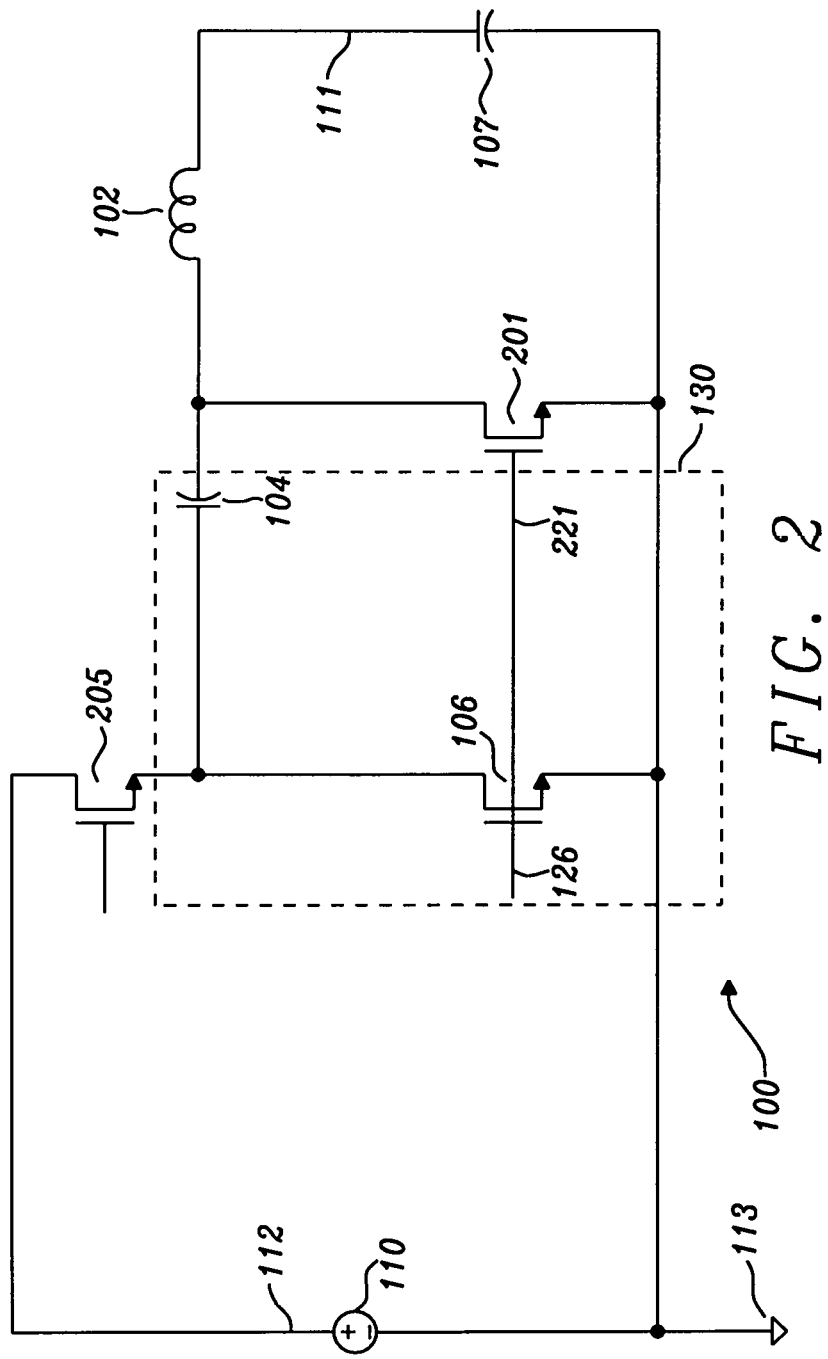
FIG. 2 shows an example buck converter with short circuit protection circuitry.

FIG. 2 shows the use of protection circuitry 130 in the context of a buck converter comprising a high side power switch 205 and a low side power switch 106 (controlled via the control port 126). The auxiliary switch 201 is switched substantially in synchronicity with the low side power switch 106.

Figure 3:
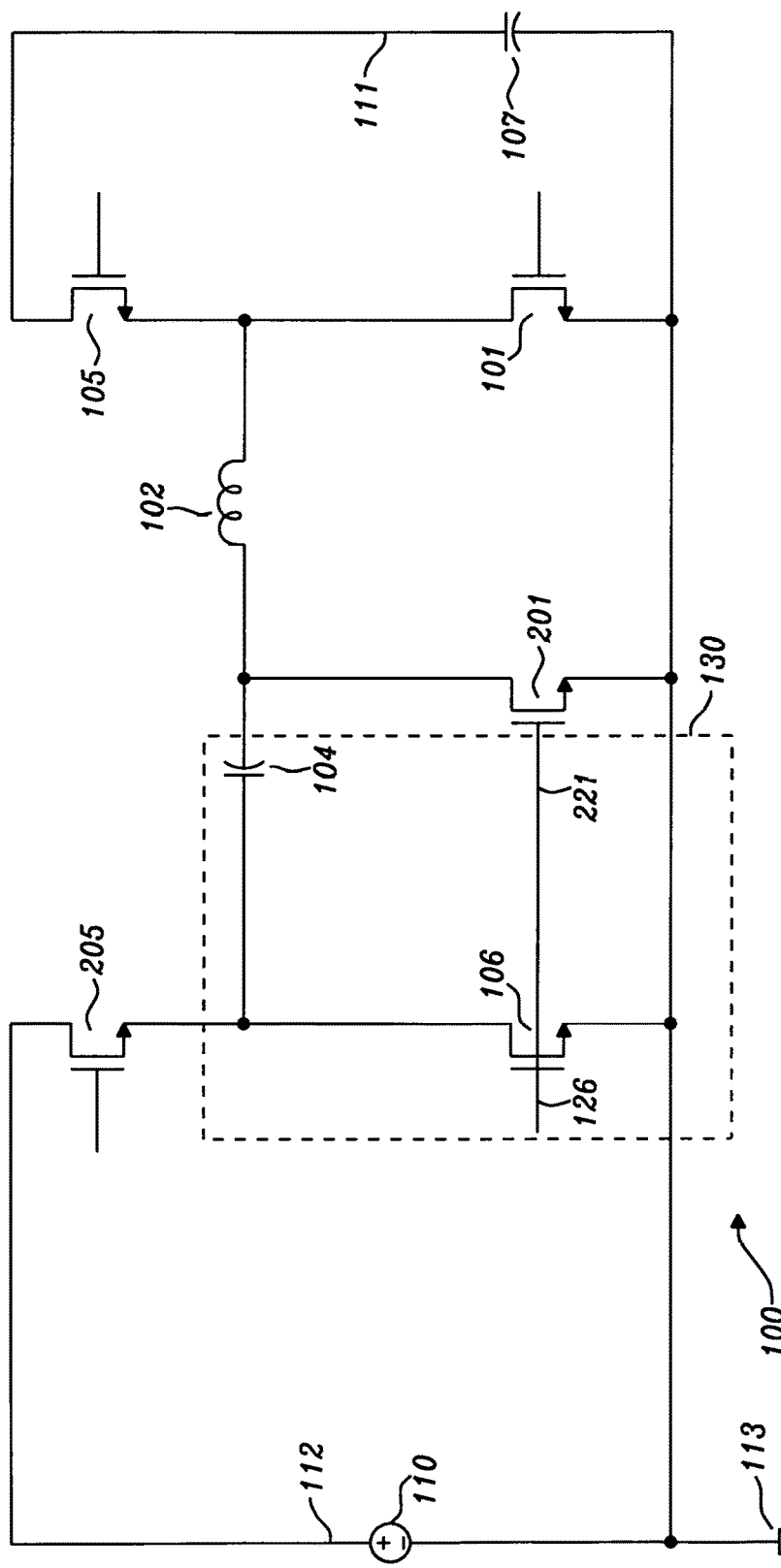
FIGS. 3 and 4 show example buck-boost converters with short circuit protection circuitry.
Figure 4:
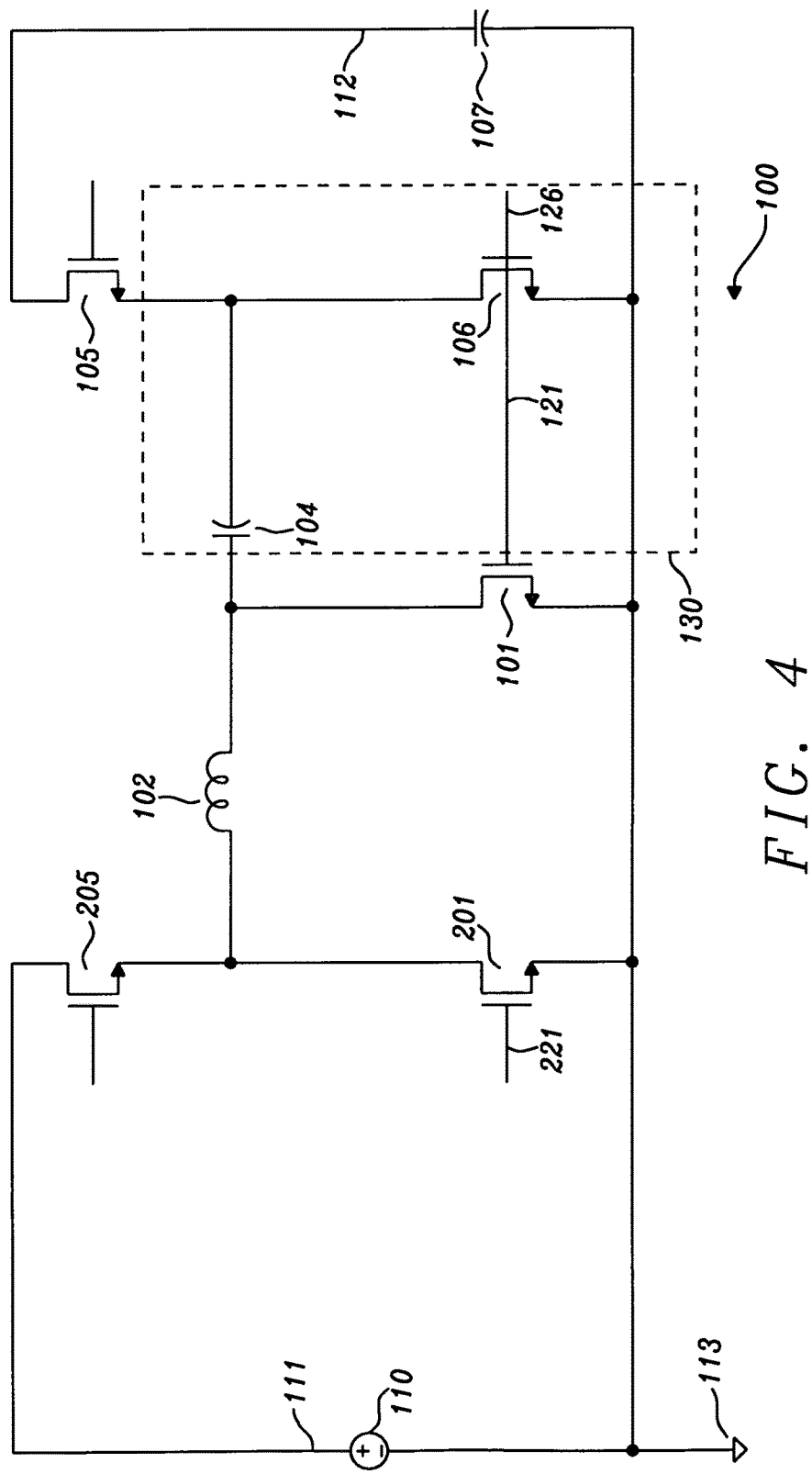

FIG. 3 shows a first variant for the use of the protection circuitry 130 within a buck-boost power converter, wherein the auxiliary switch 201 is controlled in synchronicity with the low side switch 106 of the buck stage. FIG. 4 shows a second variant for the use of the protection circuitry 130 within a buck-boost power converter, wherein the auxiliary switch 101 is controlled in synchronicity with the low side switch 106 of the boost stage.

Figure 5:
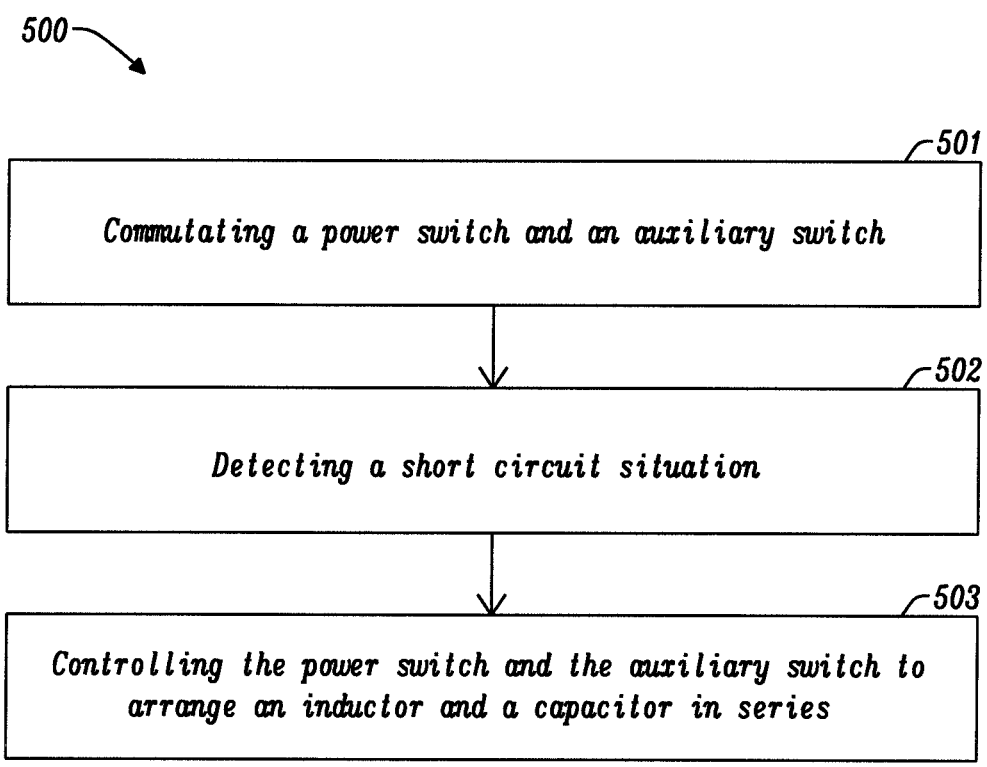
FIG. 5 shows a flow chart of an example method for providing short circuit protection for a DC-DC-switched mode power converter.

FIG. 5 shows a flow chart of an example method 500 for controlling a switched mode power converter 100 as described in the present document. The switched mode power converter 100 is configured to convert electrical power between a first voltage at a first port 111 and a second voltage at a second port 112, wherein the first and second voltages are relative to a reference potential 113. The first port 111 may be the input port and the second port 112 may be the output port (or vice versa). Typically the first voltage and the second voltage are different (e.g. by a factor 2).

The power converter 100 comprises an inductive element 102 (e.g. an inductor or coil) having a first side and a second side, wherein the first side of the inductive element 102 is coupled to the first port 111. Furthermore, the power converter 100 comprises a power switch 101, 201 configured to couple or to decouple the second side of the inductive element 102 to or from the reference potential 113. In addition, the power converter 100 comprises a capacitive element 104 (e.g. a capacitor) having a first side and a second side, wherein the first side of the capacitive element 104 is coupled to the power switch 101, 201 and wherein the second side of the capacitive element 104 is coupled to the second port 112 (e.g. via a second power switch or diode 105, 205). In addition, the power converter 100 comprises an auxiliary switch 106 configured to couple or to decouple the second side of the capacitive element 104 to or from the reference potential 113.

The method 500 comprises, during standard operation of the power converter, commutating 501 a power switch and an auxiliary switch between on-state and off-state for a sequence of commutation cycles (thereby converting electrical power between a first port and a second port). Furthermore, the method 500 comprises detecting 502 a short circuit situation at the first or second port of the power converter. In addition, the method 500 comprises, in reaction to detecting 502 a short circuit situation, controlling 503 the power switch and the auxiliary switch to arrange a capacitive element and an inductive element in series between the first and second port of the power converter. As a result of this, the first port and the second port are decoupled from one another for DC current (thereby providing short circuit protection for the first port in case of a short circuit at the second port, or vice versa).

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A switched mode power converter configured to convert electrical power between a first voltage at a first port and a second voltage at a second port; wherein the first and second voltages are relative to a reference potential; wherein the power converter comprises
    an inductive element having a first side and a second side; wherein the first side of the inductive element is coupled to the first port;
    a power switch configured to couple or to decouple the second side of the inductive element to or from the reference potential;
    a capacitive element having a first side and a second side; wherein the first side of the capacitive element is coupled to the power switch; wherein the second side of the capacitive element is coupled to the second port and wherein the second side of the inductive element is coupled to the first side of the capacitive element;
    an auxiliary switch configured to couple or to decouple the second side of the capacitive element to or from the reference potential; and
    a control unit configured to control the power switch and the auxiliary switch in a repetitive manner to convert electrical power, wherein the control unit is configured to detect a short circuit situation at the first or second port and in reaction to this, put both the power switch and the auxiliary switch in an off-state such that the capacitive element and the inductive element are arranged in series between the first and second port.

2. The switched mode power converter of claim 1, wherein the power switch is configured to couple or to decouple the first side of the capacitive element to or from the reference potential.

3. The switched mode power converter of claim 1, wherein the control unit is configured to control the power switch and the auxiliary switch within a sequence of commutation cycles, such that a commutation cycle comprises
- a first phase during which the power switch couples the second side of the inductive element to the reference potential and during which the auxiliary switch couples the second side of the capacitive element to the reference potential; and
- a second phase during which the power switch decouples the second side of the inductive element from the reference potential and during which the auxiliary switch decouples the second side of the capacitive element from the reference potential.

4. The switched mode power converter of claim 1, wherein the control unit is configured to control the power switch and the auxiliary switch within a sequence of commutation cycles, such that within a commutation cycle
- the power switch starts coupling the second side of the inductive element to the reference potential at a first coupling time instant;
- the auxiliary switch starts coupling the second side of the capacitive element to the reference potential at a second coupling time instant; and
- the first coupling time instant precedes the second coupling time instant by at least a pre-determined coupling offset.

5. The switched mode power converter of claim 1, wherein the control unit is configured to control the power switch and the auxiliary switch within a sequence of commutation cycles, such that within a commutation cycle
- the power switch starts decoupling the second side of the inductive element from the reference potential at a first decoupling time instant;
- the auxiliary switch starts decoupling the second side of the capacitive element from the reference potential at a second decoupling time instant; and
- the first decoupling time instant and the second decoupling time instant are offset at the most by a pre-determined decoupling offset.

6. The switched mode power converter of claim 1, wherein the control unit is configured to control the power switch and the auxiliary switch within a sequence of commutation cycles, such that within a commutation cycle
- the power switch starts coupling the second side of the inductive element to the reference potential prior to the time instant at which the auxiliary switch starts coupling the second side of the capacitive element to the reference potential; and/or
- the power switch starts decoupling the second side of the inductive element from the reference potential substantially at the same time instant at which the auxiliary switch starts decoupling the second side of the capacitive element from the reference potential.

7. The switched mode power converter of claim 1, wherein the control unit is configured to control the power switch and the auxiliary switch within a sequence of commutation cycles, such that within a commutation cycle the power switch and the auxiliary switch are each turned on and turned off exactly once.

8. The switched mode power converter of claim 1, wherein the control unit is configured to control the power switch and the auxiliary switch within a sequence of commutation cycles, such that within a commutation cycle the power switch and the auxiliary switch are turned on and/or turned off substantially in synchronicity.

9. The switched mode power converter of claim 1, wherein the control unit is configured to control the power switch and the auxiliary switch within a sequence of commutation cycles, such that a commutation cycle comprises
- a first phase during which the inductive element is magnetized and during which the capacitive element is discharged; and
- a second phase during which the inductive element is demagnetized by coupling the second side of the inductive element to the second port via the capacitive element.

10. The switched mode power converter of claim 1, wherein the power converter comprises a buck converter configured to transfer electrical power from the second port to the first port.

11. The switched mode power converter of claim 1, wherein the power converter comprises a boost converter configured to transfer electrical power from the first port to the second port.

12. The switched mode power converter of claim 1, wherein the power converter comprises a buck-boost converter configured to transfer electrical power from the first port to the second port or to transfer electrical power from the second port to the first port.

13. The switched mode power converter of claim 1, wherein the power switch and the auxiliary switch comprise n-type metal oxide semiconductor, MOS, switches.

14. The switched mode power converter of claim 1, wherein the power converter comprises
- a second power switch configured to couple or to decouple the second side of the capacitive network to or from the second port; and/or
- the control unit is configured to control the power switch and the second power switch such that the power switch and the second power switch are turned on in a mutually exclusive manner.

15. A method for controlling a switched mode power converter, wherein the method comprises,
- during standard operation, commutating a power switch and an auxiliary switch between on-state and off-state for a sequence of commutation cycles;
- detecting a short circuit situation at a first or second port of the power converter; and
- controlling the power switch and the auxiliary switch to arrange a capacitive element and an inductive element in series between the first and second port of the power converter to decouple the first port and the second port for DC current.

16. The method of claim 15, wherein a second side of the inductive element couples to a first side of the capacitive element such that the inductive element and the capacitive element arrange in series, when the power switch and the auxiliary switch are in off-state.

17. The method of claim 16, wherein the power switch couples or decouples the first side of the capacitive element to or from a reference potential.

18. The method of claim 15, wherein a control unit controls the power switch and the auxiliary switch within a sequence of commutation cycles, such that within a commutation cycle the power switch and the auxiliary switch each turn on and turn off exactly once.

19. The method of claim 18, wherein the control unit controls the power switch and the auxiliary switch within a sequence of commutation cycles, such that within a commutation cycle the power switch and the auxiliary switch turn on and/or turn off substantially in synchronicity.

20. The method of claim 18, wherein the control unit detects a short circuit situation at the first or second port, and controls the power switch and the auxiliary switch to arrange the capacitive element and the inductive element in series between the first and second port.

* * * * *